United States Patent [19]

Bonilla

[11] Patent Number: 5,125,365

[45] Date of Patent: Jun. 30, 1992

[54] RELEASE DOG LEASH APPARATUS

[76] Inventor: Anibal Bonilla, 29 Emerson St., Chicopee, Mass. 01013

[21] Appl. No.: 756,474

[22] Filed: Sep. 9, 1991

[51] Int. Cl.$^5$ .................. A01K 1/00; A01K 3/00; A01K 29/00
[52] U.S. Cl. .................. 119/110; 119/111; 119/114; 119/159
[58] Field of Search ............ 119/109, 110, 111, 106, 119/114, 159; 24/326

[56] References Cited

U.S. PATENT DOCUMENTS

| D. 258,243 | 2/1981 | Barbero, Jr. et al. | D30/39 |
|---|---|---|---|
| 296,764 | 4/1884 | Marquardt | 119/114 |
| 2,784,698 | 3/1957 | Dieppa | 119/109 |
| 2,821,169 | 1/1958 | Barhorst | 119/114 |
| 3,074,378 | 1/1963 | Clayton | 119/110 |
| 3,099,250 | 2/1962 | Soles, Jr. | 119/114 |
| 3,687,114 | 8/1972 | Berkstresser | 119/106 |
| 3,910,234 | 10/1975 | Henson | 119/111 |
| 4,404,927 | 9/1983 | Woutat | 119/114 |
| 4,522,153 | 6/1985 | Vander Horst | 119/109 |
| 4,903,638 | 2/1990 | Lacey | 119/114 |

FOREIGN PATENT DOCUMENTS 2846087 5/1980 Fed. Rep. of Germany ...... 119/111

Primary Examiner—Gene Mancene
Assistant Examiner—Cindy A. Cherichetti
Attorney, Agent, or Firm—Leon Gilden

[57] ABSTRACT

A flexible sheath mounts a handle at an upper end thereof and a support housing at a lower end thereof, wherein the support housing includes a ring member defined of a tubular configuration, with an entrance, and an arcuate closure member reciprocatably mounted within the tubular member for effective opening and closing of the tubular member relative to the entrance upon selective bias retraction of the closure member within the tubular member by the pulling of an associated pull ring within the handle in operative association with the closure member. A modification of the invention includes a housing structure, with the closure member positioned at an entrance of a housing recess to receive a dog leash or collar therewithin. The housing includes a piston and lever construction to project a quantity of a flea powder and the like relative to the associated animal upon opening of the closure member relative to the entrance. The handle may further be provided with a cavity to receive a repellent canister therewithin.

4 Claims, 4 Drawing Sheets

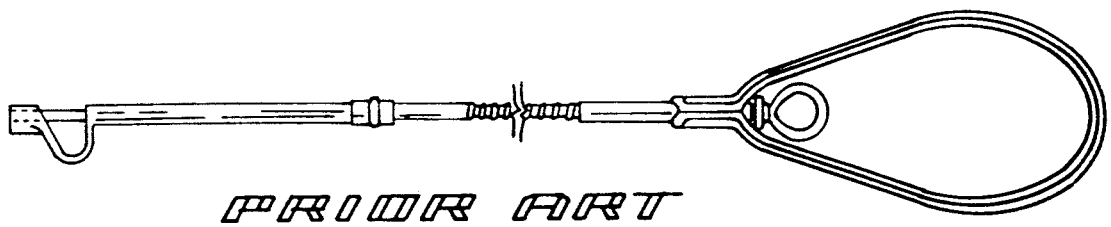
Fig 1
PRIOR ART
Fig 2
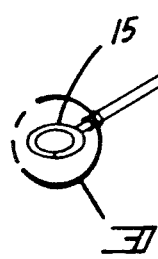
Fig 3
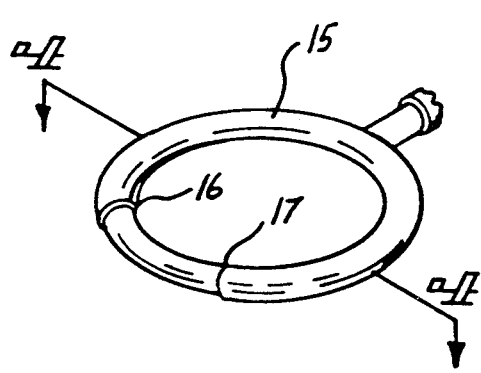

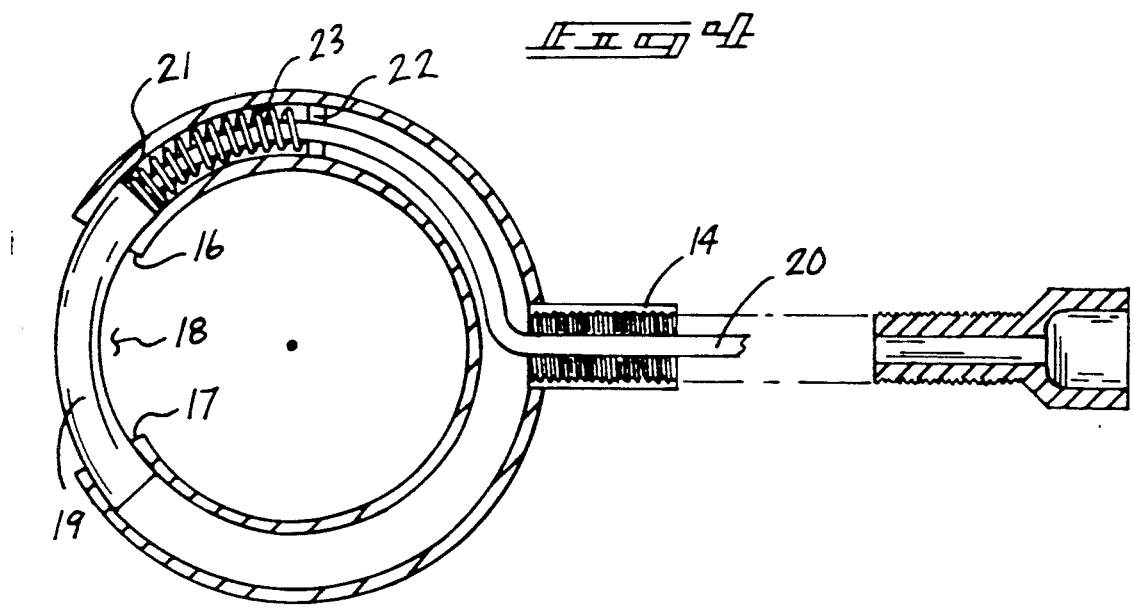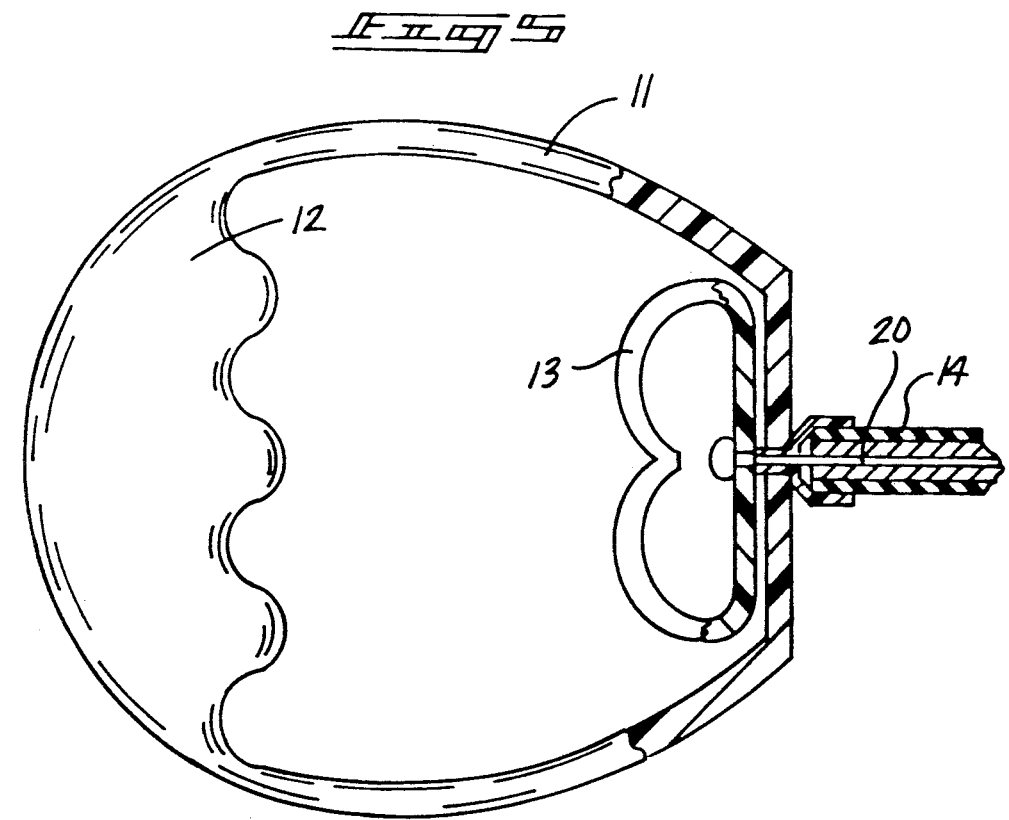

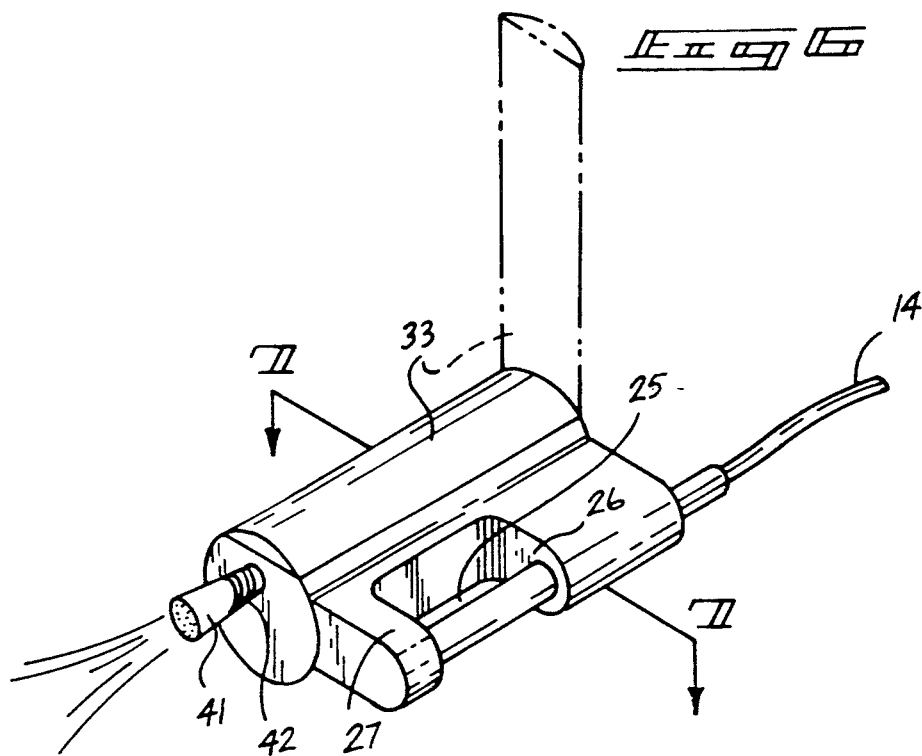
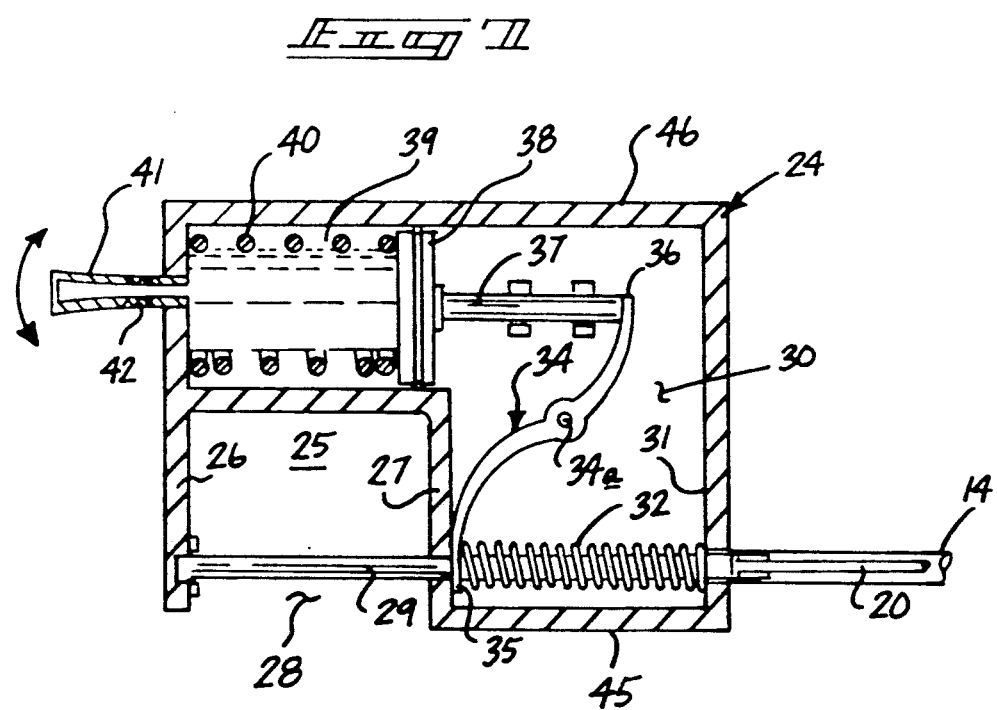

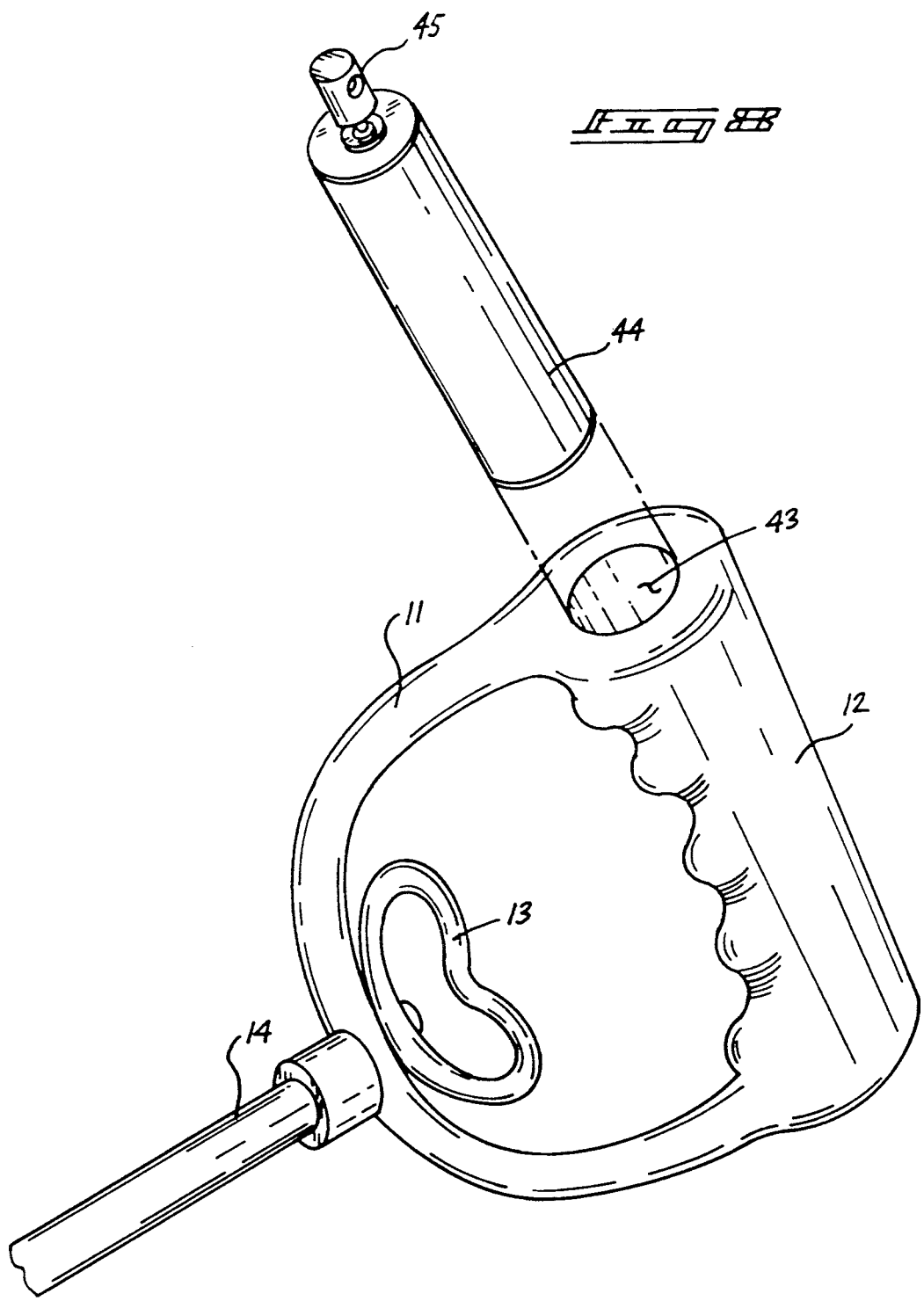

RELEASE DOG LEASH APPARATUS

BACKGROUND OF THE INVENTION

1. Field of the Invention

The field of invention relates to tether apparatus, and more particularly pertains to a new and improved release dog leash apparatus wherein the same permits selective and immediate release of an animal upon actuation of the organization.

2. Description of the Prior Art

Various tethers or leashes are utilized in the controlling of dogs and other such pets, wherein situations such as in military or police-type activity quick release of an animal is desired to permit the animal to proceed according to a training scheme. Such apparatus is exemplified in the prior art in U.S. Pat. No. 3,910,234 to Henson wherein a handle mounts a pull ring to release a locking bolt relative to a ring.

U.S. Pat. No. 4,149,492 to Kovacs sets forth a remotely actuated control leash wherein a cable is operative to release a bolt-like member from a support eye.

U.S. Pat. No. 4,404,927 to Woutat sets forth a further example of a leash with a remotely operative release member.

U.S. Pat. No. 4,932,362 to Birchmire, et al. sets forth a further example of a quick release animal collar, wherein a spring finger is depressed by an operator to release an animal relative to the control structure.

As such, it may be appreciated that there continues to be a need for a new and improved release dog leash apparatus as set forth by the instant invention which addresses both the problems of ease of use as well as effectiveness in construction in effecting immediate release of an animal relative to a controlling leash structure and in this respect, the present invention substantially fulfills this need.

SUMMARY OF THE INVENTION

In view of the foregoing disadvantages inherent in the known types of dog leash apparatus now present in the prior art, the present invention provides a release dog leash apparatus wherein the same is operative to effect immediate release of a dog collar relative to the leash structure. As such, the general purpose of the present invention, which will be described subsequently in greater detail, is to provide a new and improved release dog leash apparatus which has all the advantages of the prior art dog leash apparatus and none of the disadvantages.

To attain this, the present invention provides a flexible sheath mounting a handle at an upper end thereof and a support housing at a lower end thereof, wherein the support housing includes a ring member defined of a tubular configuration, with an entrance, and an arcuate closure member reciprocatably mounted within the tubular member for effective opening and closing of the tubular member relative to the entrance upon selective bias retraction of the closure member within the tubular member by the pulling of an associated pull ring within the handle in operative association with the closure member. A modification of the invention includes a housing structure, with the closure member positioned at an entrance of a housing recess to receive a dog leash or collar therewithin. The housing includes a piston and lever construction to project a quantity of a flea powder and the like relative to the associated animal upon opening of the closure member relative to the entrance. The handle may further be provided with a cavity to receive a repellent canister therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved release dog leash apparatus which has all the advantages of the prior art dog leash apparatus and none of the disadvantages.

It is another object of the present invention to provide a new and improved release dog leash apparatus which may be easily and efficiently manufactured and marketed.

It is a further object of the present invention to provide a new and improved release dog leash apparatus which is of a durable and reliable construction.

An even further object of the present invention is to provide a new and improved release dog leash apparatus which is susceptible of a low cost of manufacture with regard to both materials and labor, and which accordingly is then susceptible of low prices of sale to the consuming public, thereby making such release dog leash apparatus economically available to the buying public.

Still yet another object of the present invention is to provide a new and improved release dog leash apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of a prior art quick release dog leash apparatus.

FIG. 2 is an orthographic view of the instant invention.

FIG. 3 is an isometric illustration, somewhat enlarged, of the invention as set forth in FIG. 2.

FIG. 4 is an orthographic view, taken along the lines 4—4 of FIG. 3 in the direction indicated by the arrows.

FIG. 5 is an orthographic top view, partially in section, of the handle structure of the invention.

FIG. 6 is an isometric illustration of a modified support housing utilized by the invention.

FIG. 7 is an orthographic view, taken along the lines 7—7 of FIG. 6 in the direction indicated by the arrows.

FIG. 8 is an isometric illustration of a modified handle structure utilized by the invention.

DESCRIPTION OF THE PREFERRED EMBODIMENT

With reference now to the drawings, and in particular to FIGS. 1 to 8 thereof, a new and improved release dog leash apparatus embodying the principles and concepts of the present invention and generally designated by the reference numeral 10 will be described.

FIG. 1 illustrates a prior art quick release dog leash apparatus, as exemplified in U.S. Pat. No. 3,910,234, illustrating a pull ring operative to withdraw a locking bolt relative to a dog collar support loop.

More specifically, the release dog leash apparatus 10 of the instant invention essentially comprises a handle loop 11, including a grasp handle portion 12 in confronting relationship to a pull ring 13 positioned within the handle loop 11 and reciprocatably mounted relative to a flexible sheath 14 directed from and secured to the handle portion 11 and extending and mounting its forward terminal end a support housing defining a semicircular support ring 15 formed of a tubular construction. The support ring 15 includes a first end 16 spaced from a second end 17 to define a ring entrance opening 18. An arcuate closure member 19 is reciprocatably mounted within the support ring 15 and extends from the first end 16 through the second end 17 in a first position and is retracted to a spaced second position, wherein the closure member 19 is spaced from the second end 17. It should be further noted that the entrance opening 18 is defined by a predetermined first arc less than ninety degrees, wherein the closure member 19 is defined as an arcuate configuration of a second arc less than the first arc. The pull ring 13 is mounted to an upper terminal end of a cable 20 directed coextensively through the flexible sheath 14 and directed through the support ring 15 and fixedly mounted to the closure member rear surface 21. An abutment plate 22 is mounted within the support ring 15 spaced from the first end 16, with a return spring 23 captured between the abutment plate 22 and the closure member's rear surface 21 to normally bias the closure member 19 to the first position, as illustrated in FIG. 3 for example.

FIGS. 6 and 7 illustrate a modified housing 24 mounted at the forward terminal end of the sheath 14 spaced from the handle loop 11 in lieu of the support ring 15. The housing 24 includes a housing forward wall 26 spaced from a housing rear wall 31. The housing includes spaced side walls with first side wall 45 spaced from a second side wall 46. The first side wall 45 includes a recess 25 directed interiorly of the housing 24 positioned between the housing forward wall 26 and a recess rear wall 27 that is spaced from and positioned medially of the forward wall 26 and the rear wall 31. A recess entrance 28 includes a closure bolt 29 reciprocatable relative to the entrance from a first position engaged within the forward wall 26 to a second position spaced from the forward wall 26. The closure bolt 29 includes a bolt return spring mounted fixedly between the rear wall 31 and the recess rear wall 27, whereupon retraction of the cable 20 effects rearward reciprocation of a bolt 29 to a second position to permit positioning of a dog leash or the like within the recess 25 about the bolt 29.

The housing 24 includes a first housing cavity 30 positioned between the rear wall 31 and the recess rear wall 27 that includes a pivot lever 34 pivotally mounted therewithin about a pivot lever axle 34a. The lever 34 includes a first end 35 mounted between the return spring 32 and the recess rear wall 27, with a lever second end 36 mounted above a piston rod 37. Rearward reciprocation of the cable 20 effects pivotment of the lever 34 due to its first end 35 fixedly mounted to the bolt 29. Upon pivotment of the lever 34, the piston rod 37 is projected interiorly of a magazine chamber 39 or second cavity that includes a piston 38 mounted to a forward terminal end of the piston rod 37. The magazine chamber 39 is arranged for reception of a predetermined quantity of a flea powder or the like contained therewithin, wherein projection of the piston 39 effects projection of such powder through a nozzle 41 directed through the housing forward wall 26. The nozzle 41 includes a pivot joint 42 adjacent the forward wall 26 to permit angulation of the nozzle as required for orientation of the nozzle relative to an animal mounted to the support housing 24. A magazine spring 40 effects reciprocation of the piston 38 to a first position, as illustrated in FIG. 7, from a second position with the piston 38 projected into the magazine chamber or second cavity.

FIG. 8 illustrates the handle portion 12, including a grasp handle cavity 43 defined by a first axial length to receive a pressurized container 44 of a second length equal to or greater than the first length complementarily mounted within the cavity 43. The pressurized container 44 includes a container nozzle 45 to project a repellent from within the container 44 to utilize various components such as Mace (R) for the repulsion of an attracted animal, such as larger dogs relative to a dog mounted to the apparatus 10.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A release dog leash apparatus, comprising, a handle loop, the handle loop including a grasp handle portion positioned at an upper end of the handle loop, with a pull ring reciprocatably mounted through the handle loop in confronting relationship relative to the grasp handle portion at a lowermost portion of the handle loop, and
   - a flexible sheath, the upper terminal end of the flexible sheath mounted to the handle loop and a lower terminal end of the flexible sheath mounted to a support housing, the pull ring including a cable mounted to the pull ring, with the cable directed coextensively through the sheath and directed interiorly of the housing, and
   - the housing including a recess, with the recess including a recess entrance, and
   - a closure bolt reciprocatably mounted within the housing within the recess entrance, and
   - the housing includes a housing forward wall spaced from a housing rear wall, and a housing first side wall spaced from a housing second side wall, and the recess directed through the first side wall into the housing, with the closure bolt defined by a coaxially aligned closure bolt and the recess defining a recess rear wall spaced from the housing forward wall, and a return spring mounted within the housing between the recess rear wall and the housing rear wall, and the cable mounted to a rear terminal end of the closure bolt, and
   - a pivot lever mounted within the housing between the recess rear wall and the housing rear wall, with the pivot lever including a pivot lever axle mounted fixedly within the housing, and the pivot lever including a pivot lever first end mounted between the return spring and the recess rear wall, and the housing including a magazine chamber, the magazine chamber mounted between the recess and the housing second wall, with the magazine chamber including a piston reciprocatably mounted therewithin, the piston including a piston rod projecting rearwardly, with the pivot lever including a pivot lever second end positioned and mounted to an upper terminal end of the piston rod spaced from the piston, and a magazine return spring positioned between the piston and the housing forward wall, and a nozzle in communication with the magazine chamber directed through the housing forward wall.

2. An apparatus as set forth in claim 1 wherein the nozzle includes a pivot joint to permit selective pivotment of the nozzle relative to the housing.

3. An apparatus as set forth in claim 2 including a housing lid mounted to the housing above the magazine chamber to permit replenishment of the magazine chamber with a pesticide therewithin.

4. An apparatus as set forth in claim 3 wherein the grasp handle portion includes a handle cavity directed therewithin, wherein the handle cavity includes a pressurized container mounted within the cavity, wherein the pressurized container includes a nozzle projecting beyond the handle cavity, and the pressurized container including a repellent therewithin to permit selective application of a repellent to an intruder dog.

* * * * *